United States Patent [19]
Burrows

[11] 3,916,283
[45] Oct. 28, 1975

[54] DC TO DC CONVERTER
[75] Inventor: John H. Burrows, Pierrefonds, Canada
[73] Assignee: Pylon Electronic Development Company Ltd., Lachine, Canada
[22] Filed: Feb. 10, 1975
[21] Appl. No.: 548,770

[52] U.S. Cl. .................................. 321/2; 321/18
[51] Int. Cl.² ........................................ H02M 3/28
[58] Field of Search ..................... 321/2, 18, 45 R

[56] References Cited
UNITED STATES PATENTS

| | | | |
|---|---|---|---|
| 3,297,936 | 1/1967 | Ruch ................................. | 321/2 X |
| 3,341,765 | 9/1967 | Rogers, Jr. et al. .................... | 321/2 |
| 3,373,334 | 3/1968 | Geisz et al. ........................... | 321/2 |
| 3,515,977 | 6/1970 | Diczhazy .............................. | 321/18 |
| 3,670,234 | 6/1972 | Joyce .................................. | 321/2 X |
| 3,735,235 | 5/1973 | Hamilton et al. ...................... | 321/2 |
| 3,794,907 | 2/1974 | Fucito .......................... | 321/45 R X |
| 3,838,329 | 9/1974 | Michelet et al. ....................... | 321/2 |

Primary Examiner—William M. Shoop

[57] ABSTRACT

Various types of static DC to DC converters are known. Some of these have output rectifiers including phase controlled SCRs. The present invention eliminates the need for controlled output SCRs by pulse width modulation of switching elements in a control circuit controlling the converter circuitry itself. This results in the elimination of some switching devices, higher reliability and higher-efficiency. A unijunction oscillator drives a one-shot multivibrator and a flip flop. The unijunction oscillator, one-shot multivibrator and flip flop feed two AND gates which are alternately enabled to allow pulses of current to flow from a DC source through opposite halves of a primary winding of a transformer. The output of the secondary winding is rectified and filtered to provide the converter output. Voltage regulation is accomplished by controlling the one-shot multivibrator. In one embodiment, paralleling of a number of converters is enabled by providing for frequency and pulse width synchronization.

18 Claims, 7 Drawing Figures

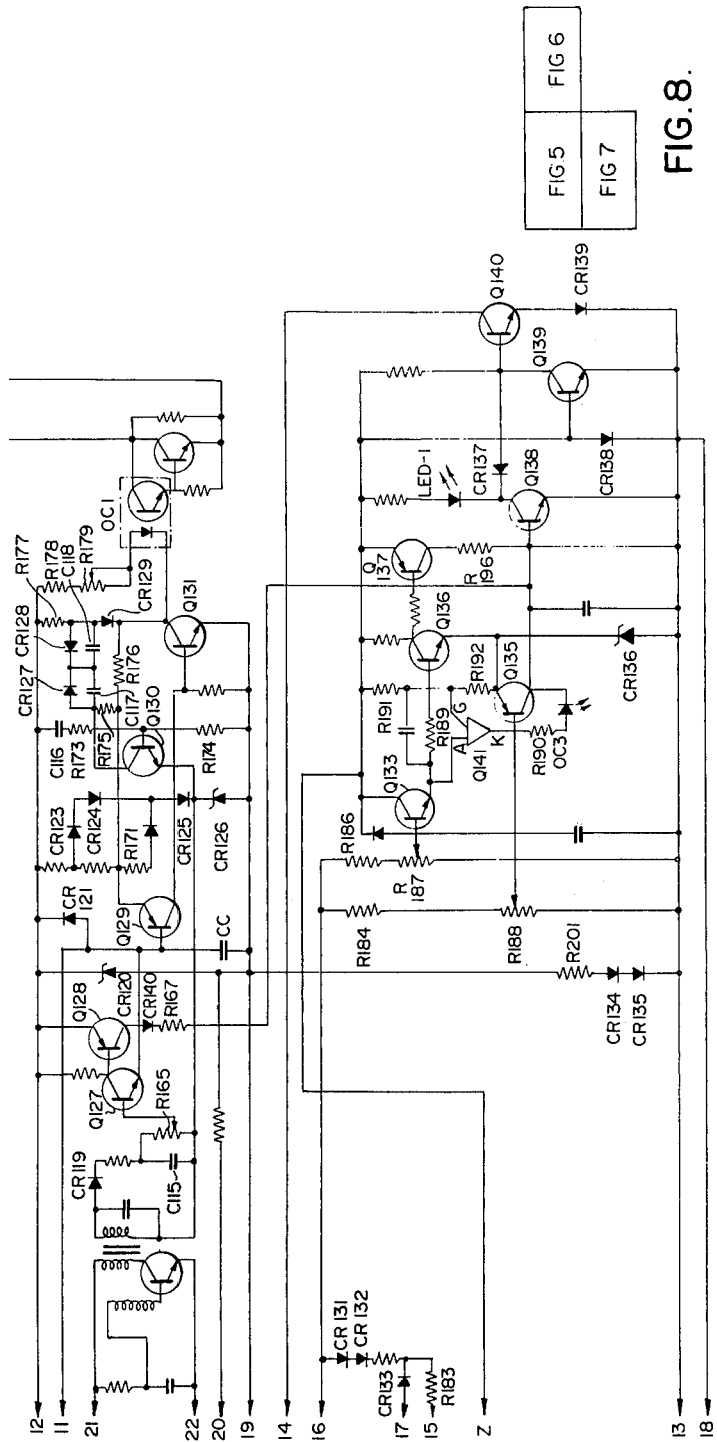

DC TO DC CONVERTER

BACKGROUND OF THE INVENTION

This invention relates to DC to DC converters and in particular to static DC to DC converters.

Various types of static DC to DC converters are already known. These are devices which convert one level of DC voltage to another level of DC voltage. Such converters are frequently used, for example, in telephone offices which already have a battery supply, typically 48 volts. As these batteries require charging equipment, it is preferable to use a converter rather than provide separate batteries for various voltages which may be desired.

DC-DC regulated converters as presently known are as follows: Power switching devices alternately provide power to the primary of a centre tapped transformer. The power from the secondary is rectified and regulated by one of the following means:

I — Phase control in the rectification.
II — Series regulation.
III — Chopper or switching regulation.

These methods necessitate the use of several power switching devices resulting in relatively high power dissipation.

SUMMARY OF THE INVENTION

This inventon minimizes the use of power switching devices resulting in greater reliability and higher efficiency. In addition, sloping of the wavefront reduces the undesirable effects of Radio Frequency Interference inherent in these devices.

The present invention eliminates the need for controlled SCRs in the output rectifier circuit by controlling the time that switching elements are on and off in a control circuit. This eliminates some switching devices and results in higher reliability.

With most known static DC and DC converters, it is difficult to place them in parallel for increased output capacity because they tend no to share the load equally. One embodiment of the present invention readily allows for paralleling of two or even several converters and for ensuring that these converters share the load equally. This is done by synchronizing the control circuits of the converters both as to pulse frequency and pulse width which results in the output pulses being of equal width also.

Voltage regulation is accomplished with the use of an optical coupler which results in complete isolation of the voltage sensing means from the feed-back circuitry. This is needed because the regulation is at the input and not at output SCRs, the output SCRs having been eliminated and replaced by a simple rectifier circuit.

Current limit sensing is done by means of a blocking oscillator which also provides isolation of the current limit circuitry from the output.

According to the invention there is provided a DC to DC converter comprising a control circuit energizable by a source of DC current and having a first pair of output terminals connected in series with said source of DC current and one-half of a center-tapped primary winding of a first transformer and a second pair of output terminals connected in series with said source of DC current and the other half of the center-tapped primary winding. The control circuit produces pulses alternately in the two halves of the center-tapped primary winding, the first transformer having a center-tapped secondary winding with each half of the secondary winding being connected to electronic switching means for causing pulses of current to flow from the source of DC current alternately in two halves of a center-tapped primary winding of a second transformer. The second transformer has a secondary winding connected to a full wave rectifier having an output connected to an output filter for providing a smooth DC output from the converter. Each of the pairs of output terminals is fed by an output transistor fed, in turn, by a driver transistor having an input fed by substantially square wave pulses and across which is connected a capacitor so that the pulses appearing at the output terminals of the control circuit are trapezoidal shaped and thus have substantially no harmonics of radio frequency.

DESCRIPTION OF THE PREFERRED EMBODIMENTS

The static DC to DC converter according to the invention is a width-modulated converter which enables a regulated output to be obtained with low output noise and low feedback noise to the battery supply. The converter is of the driven type rather than the self-oscillating type.

Figure 1:
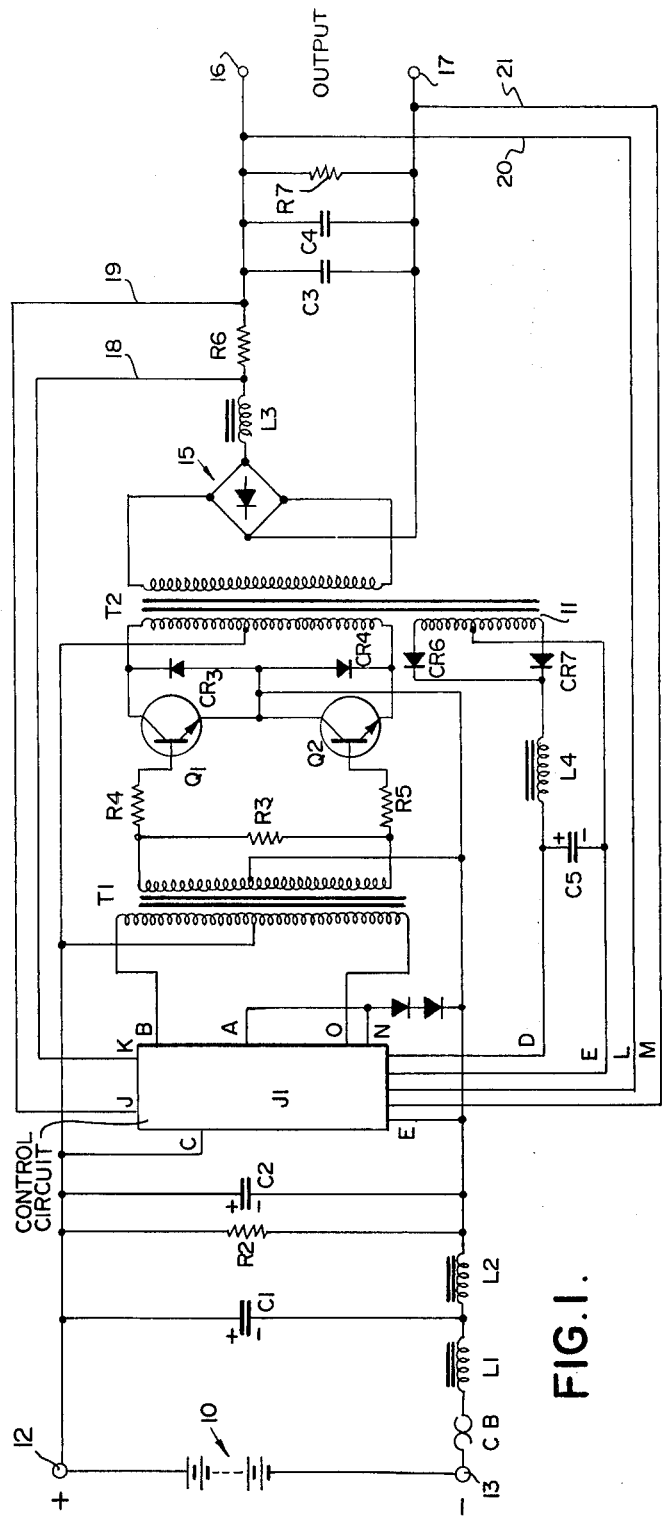
FIG. 1 is a partly block, partly schematic, diagram of a first embodiment of a static DC to DC converter according to the present invention.

Referring first to FIG. 1, the converter is fed by a source of DC current such as a battery 10 having its positive terminal connected to terminal 12 and its negative terminal connected to terminal 13 of the converter. The converter may be turned on and off by means of a circuit breaker CB. A filter comprising inductors L1 and L2, capacitors C1 and C2 and resistor R2 prevents noise generated by the converter from being fed back to the battery. This is necessary in some situations, such as telephone exchanges, where the battery is also connected to other equipment which would be adversely affected by electrical noise generated by the converter.

The control circuit J1 is energized by the battery 10, terminal C being connected to positive battery and terminal E being connected to negative battery. The control circuit J1 has a first pair of output terminals A and B connected in series with the battery 10 and one-half of the center-tapped primary winding of transformer T1 and a second pair of output terminals N and O connected in series with battery 10 and the other half of the center-tapped primary winding of transformer T1. The control circuit J1, to be described in detail later, causes current to alternately flow in the two halves of the primary winding of transformer T1. Each half of the secondary winding of transformer T1 is connnected to electronic switching means, in this case comprising transistors Q1 and Q2, for causing pulses of current to flow from the source of DC current (battery 10) alternately in the two halves of the center-tapped primary winding of transformer T2. In other words, the resulting impulses in the two halves of the secondary winding of transformer T1 cause transisitors Q1 and Q2 to alternately conduct heavily so that current from the battery flows first through the top half of the primary winding of transformer T2 and, on alternate half cycles, through the lower half of the primary winding of transformer T2. The output of the secondary winding of transformer T2 is rectified by full wave rectifier 15, filtered by L3, C3 and C4 and fed to the ouput terminals 16 and 17. Resistor R7 provides a current path when there is no load connected to the output terminals 16 and 17.

Resistor R3 across the secondary of transformer T1 minimizes overshoot that is inherent in any transformer of this type with a square wave; i.e. resistor R3 absorbs energy whenever the transformer is turned "off".

Diodes CR3 and CR4 are backlash diodes preventing any reverse voltages from being put on transistors Q1 and Q2 as well as providing input polarity protection so that if someone inadvertently puts a reverse battery on the input the transistors will not be destroyed. These diodes would then forward bias and consequently trip the input circuit breaker CB.

Note that a resistor R6 is provided in series with the output and leads 18 and 19 across resistor R6 feed the voltage developed across R6 back to terminals J and K of the control circuit J1. The voltage across resistor R6 is proportional to the output current and is fed back to the control circuit for current limiting purposes as will be made clear in connection with the description of FIGS. 2 and 3.

Leads 20 and 21 are connected directly across the output of the converter and fed back to terminals L and M of the control circuit J1. These leads provide voltage feedback as will also be further discussed in connection with FIGS. 2 and 3.

Figure 2:
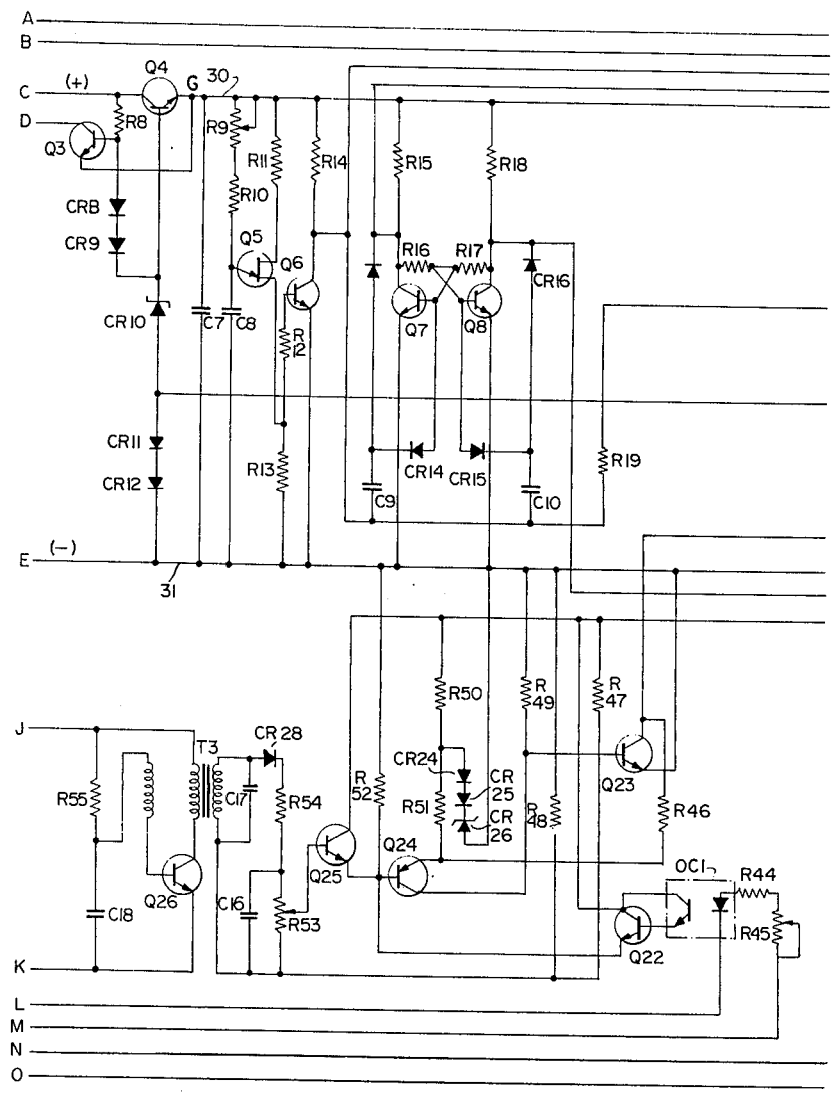
FIGS. 2 and 3 together, with FIG. 2 to the left of FIG. 3, form a schematic diagram of the control circuit J1 of FIG. 1.
Figure 3:
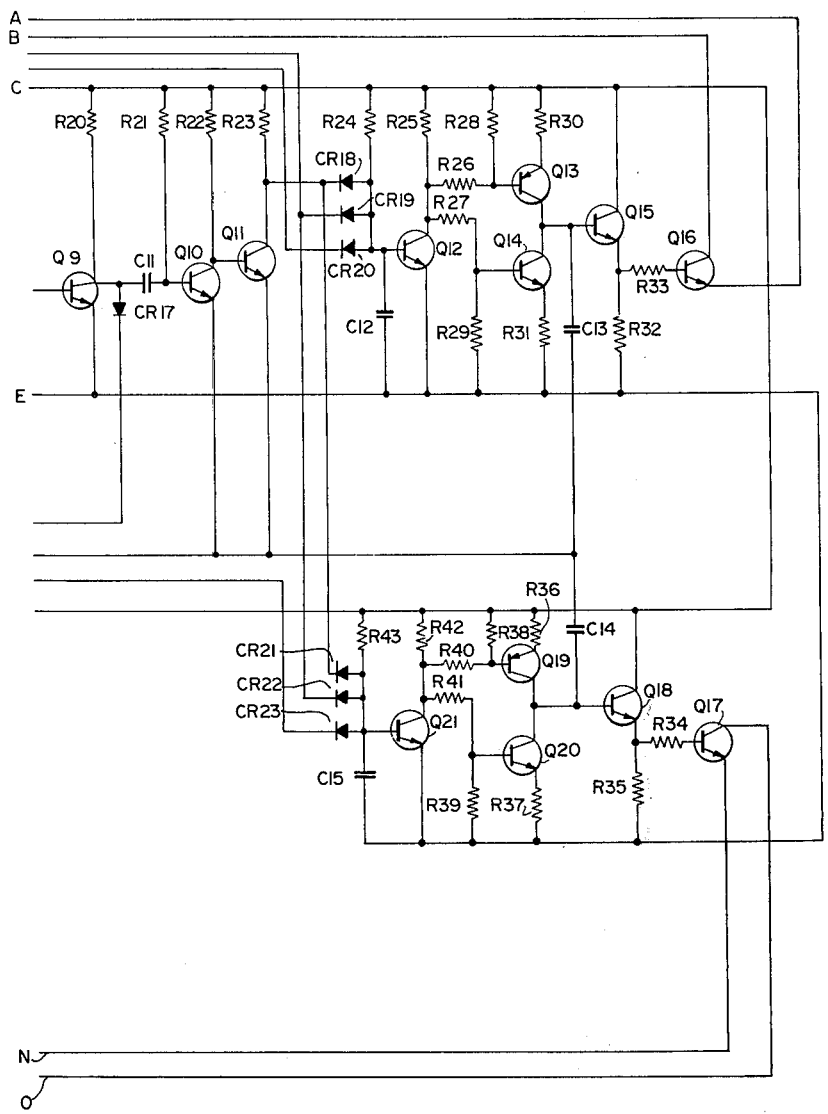

The control circuit shown in FIGS. 2 and 3 incorporates a power-saving feature including means for directly energizing the control circuit from the battery 10 during start-up of the converter and means for indirectly energizing the control circuit during normal operation of the converter. Specifically, the control circuit is energized from a tertiary winding 11 on transformer T2 (FIG. 1) during normal operation of the converter, which tertiary winding provides a lower voltage than the battery 10. Referring to the upper left part of FIG. 2 there is a threshold responsive circuit having a first input C and a second input D and an output G connected to supply electrical energy to the control circuit on energization line 30. The first input C is connected to the positive terminal of the DC source (see also FIG. 1) and the second input D is connected to the tertiary winding 11 of transformer T2. The threshold responsive circuit is responsive to a predetermined voltage level on the second input D so that when the threshold level is exceeded electrical energy is supplied to the control circuit from input D whereas when the threshold level is not exceeded electrical energy is supplied to the control circuit from input C.

The tertiary winding 11 on transformer T2 provides a voltage, rectified by diodes CR6 and CR7 and filtered by L4 and C5, resulting in a DC voltage between terminals D and E of control circuit J1, terminal E being negative and terminal D being positive. As may be seen in FIG. 2, terminal D is connected to the collector of transistor Q3 whereas the collector of Q4 is connected directly to the positive terminal of the battery via terminal C of the control circuit. Initially transistor Q3 receives no collector voltage from tertiary winding 11 of transformer T2 and hence does not conduct but transistor Q4 has full battery voltage applied to it and immediately conducts to energize the control circuit. Note that the emitters of Q3 and Q4 are directly connected together and thus always have the same potential while the base of Q3 has a higher potential than the base of Q4 because of the forward voltage drop across diodes CR8 and CR9. Current flows from terminal C through resistor R8, diodes CR8 and CR9, Zener diode CR10 and diodes CR11 and CR12 to the negative terminal E of negative energization line 31. This provides base bias for transistors Q3 and Q4. Once the converter gets started, winding 11 of transformer T2 provides a voltage via terminal D to the collector of transistor Q3 which begins to conduct and, having a higher base voltage than transistor Q4, causes transistor Q4 to turn off. The battery voltage may be 48 volts, while the voltage supplied by winding 11 may be only of the order of 26 volts. This arrangement thus provides a power-saving feature.

Capacitor C7 eliminates transient voltage spikes.

Unijunction transistor Q5, in a well-known manner, fires when capacitor C8 reaches a predetermined level, C8 being charged via variable resistor R9 and fixed resistor R10. When Q5 fires, it produces a narrow pulse across resistor R13 which is applied via resistor R12 to the base of transistor Q6 comprising a pulse former which converts the spike-shaped output of unijunction Q5 to a square pulse having the same base width as the output of Q5. A pulse former comprising transistor Q6 drives a flip-flop comprising transistors Q7 and Q8 and associated passive circuit elements.

The output of pulse former Q6 is also fed to diodes CR19 and CR22 and, via resistor R19, to the base of transistor Q9. The output of transistor Q7 is fed to diode CR20 and the output of transistor Q8 is fed to diode CR23.

Transistors Q9 and Q10 comprise a one-shot multivibrator which determines the time the AND gates are on, i.e. the two AND gates comprising diodes CR18–CR20 and CR21–CR23. Normally Q9 and Q10 are on. When the unijunction fires, it produces a pulse which causes Q6 to turn on and then off. This in turn causes Q9 to turn off and then on again. Now while Q9 is off, capacitor C11 charges through resistor R20 and the base-emitter junction of Q10. The charge is determined by the voltage divider action of R20 and the path provided by CR17 and Q23.

When transistor Q9 turns on again a negative bias is placed on the base-emitter junction of Q10 by the charge on C11 thus turning Q10 off. The charge on capacitor C11 will now begin to change by current flow through R21 and Q9 and CR11 and CR12. Q10 will turn on again when C11 has discharged to the point that its base-emitter junction is forward biased. Conduction of transistor Q10 causes transistor Q11 to be cut off thus back-biasing diodes CR18 and CR21, i.e. "enabling" these inputs.

As mentioned above, diode CR20 of the upper AND gate is fed by one output of the flip-flop while diode CR23 of the lower AND gate is fed by the other output of the flip-flop. Therefore, it is obvious that the two AND gates cannot be enabled at the same time. Either the upper AND gate or the lower AND gate may be enabled when all three of their diodes are reverse biased. Assuming the upper AND gate is enabled by inputs to all three of its diodes, capacitor C12 is charged up via resistor R24 resulting in positive voltage being applied to the base of transistor Q12, causing it to conduct. The output of Q12 is amplified by transistors Q13 and Q14 and fed to the base of driver transistor Q15 which in turn drives output transistor Q16. The emitter of Q16 connects via terminal A to the negative side of the battery while the collector connets via terminal B to the top of the primary winding of transformer T1 (see FIG. 1). The conduction of Q16 therefore allows a pulse of current to flow in the top half of the primary of transformer T1. Current flows from the positive side of the battery via terminal 12 to the center tap of the primary of transformer T1 to terminal B through output transistor Q16 (FIG. 3) to terminal A and hence to the negative side of the battery.

In a similar manner, output transistor Q17, on alternate half cycles, conducts current pulses through the lower half of the primary winding of transformer T1. As the action of the lower AND gate and associated transistors is identical to the action of the upper AND gate and associated transistors, no detailed description of this portion of the circuit is believed necessary.

It should be noted that the bases of driver transistors Q15 and Q18 are connected to negative terminal E via capacitors C13 and C14 respectively. As these capacitors require a finite time to charge up sufficiently to make transistors Q15 and Q18 conductive, these transistors cannot be turned on and off instantaneously. This means that the current pulses produced by Q15 and Q18 and amplified by Q16 and Q17 are trapezoidal in shape rather than substantially of square wave shape. It is known that a square wave contains many harmonics and these are suppressed by going to a trapezoidal wave form. What this means is that undesired radio frequency interference is substantially eliminated by the use of capacitors C13 and C14 thus eliminating the necessity for shielding of the converter which has been necessary in prior art converters in order to meet government requirements for suppression of radio frequency interference.

As mentioned previously, current limiting is done by tapping across resistor R6 (FIG. 1) with leads 18 and 19 which connect to terminals J and K feeding the input of a blocking oscillator comprising a transistor Q26 and associated passive circuit elements. When the output reaches a predetermined level the blocking oscillator will begin to oscillate. The output of the blocking oscillator is rectified and filtered by CR28 and C16. Therefore the rectified DC voltage across C16 is directly proportional to the output current.

At a predetermined output current determined by the setting of potentiometer R53, transistor Q25 will be forward biased thereby reducing conduction of transistor Q24. With reduced conduction of Q24, the voltage on the base of npn transistor Q23 will go more negative and hence conduction of transistor Q23 is reduced. This affects the charging of capacitor C11 via diode CR17 and hence affects the pulse width of the one-shot multivibrator discussed above and hence the time during which diodes CR18 and CR21 are reverse biased. Variations of this pulse width cause variations in the times the AND gates are enabled and hence variations in the width of the pulses produced by transistors Q16 and Q17. Referring to FIG. 1, it will be obvious that these variations in pulse width also affect the time of conduction of transistors Q1 and Q2 and hence the output of the converter. Reducing the pulse width reduces the output. The pusle rate is constant determined by the setting of resistor R9 but the pulse width is variable.

The anode of Zener diode CR26 is connected to the negative side of the DC source, through diodes CR24 and CR25 and resistor R50, to the positive side of the DC source. A junction between CR24 and R50 connects through resistor R51 to the emitter of transistor Q24. The emitter of transistor Q24 is connected through resistor R46 to the collector of transistor Q23. Zener diode CR26 thus provides reference voltages for the emitter of Q24 and the collector of Q23. Diodes CR24 and CR25 are simply temperature compensating diodes. Resistor R51 affects the stability of the feedback circuit.

Output voltage sensing is by means of leads 20 and 21 (FIG. 1) connected to terminals L and M which feed a light-emitting diode through variable resistor R45 and fixed resistor R44. The light emitted by the light-emitting diode feeds a light-sensitive transistor, the light-emitting diode and light-sensitive transistor combination being designated OC1. The light-sensitive transistor feeds a transistor Q22, the output of which also feeds transistor Q24. As discussed previously, increased conduction of Q24 causes reduced conduction of Q23 thus affecting the charging of capacitor C11 and hence affecting the output pulse width.

Figure 4:
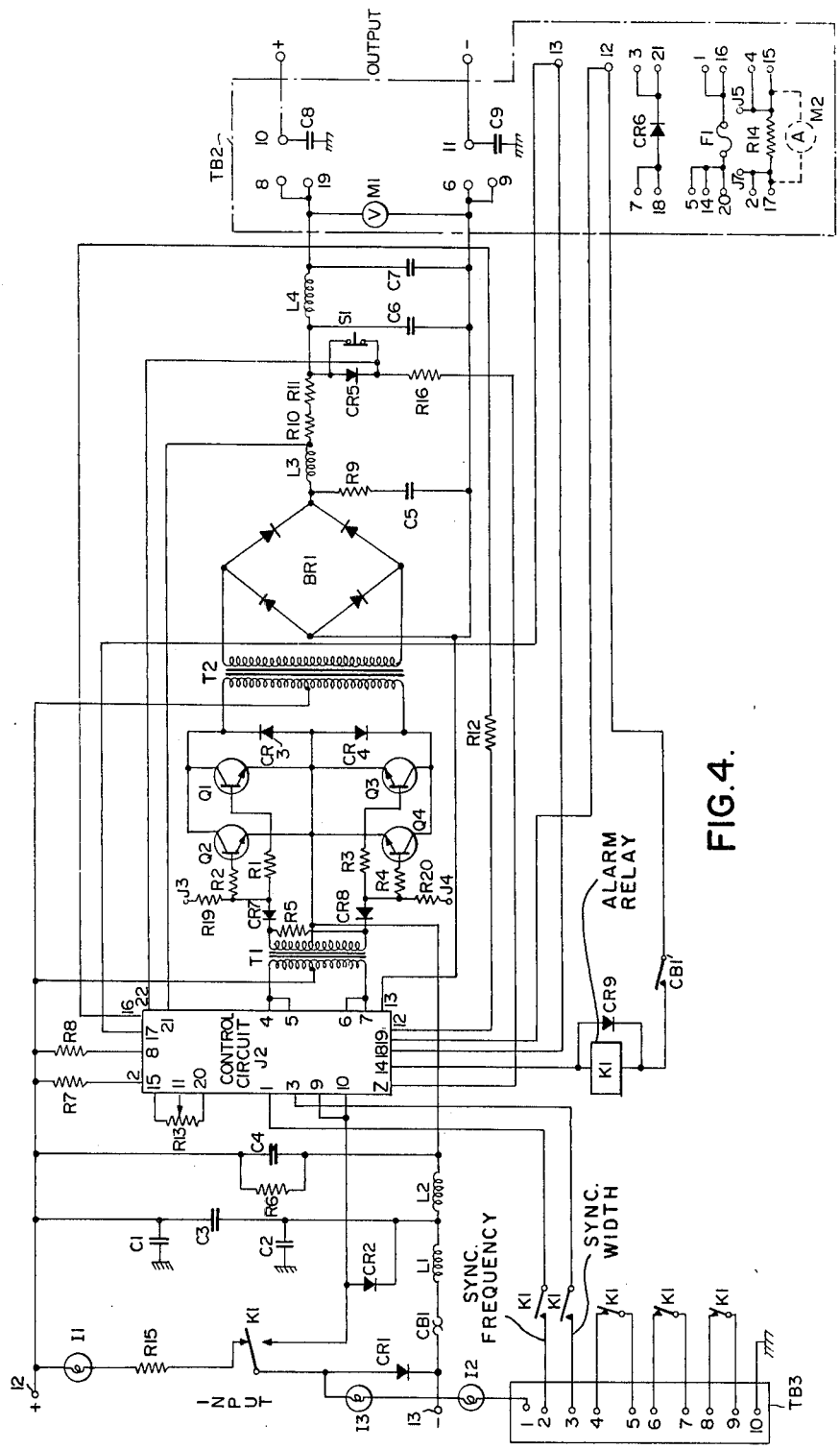
FIG. 4 is a partly block, partly schematic, diagram of a second embodiment of a static DC to DC converter according to the invention, and FIGS. 5, 6, and 7, which go together as shown in FIG. 8, comprise a schematic diagram of the control circuit J2 of FIG. 4.
Figure 5:
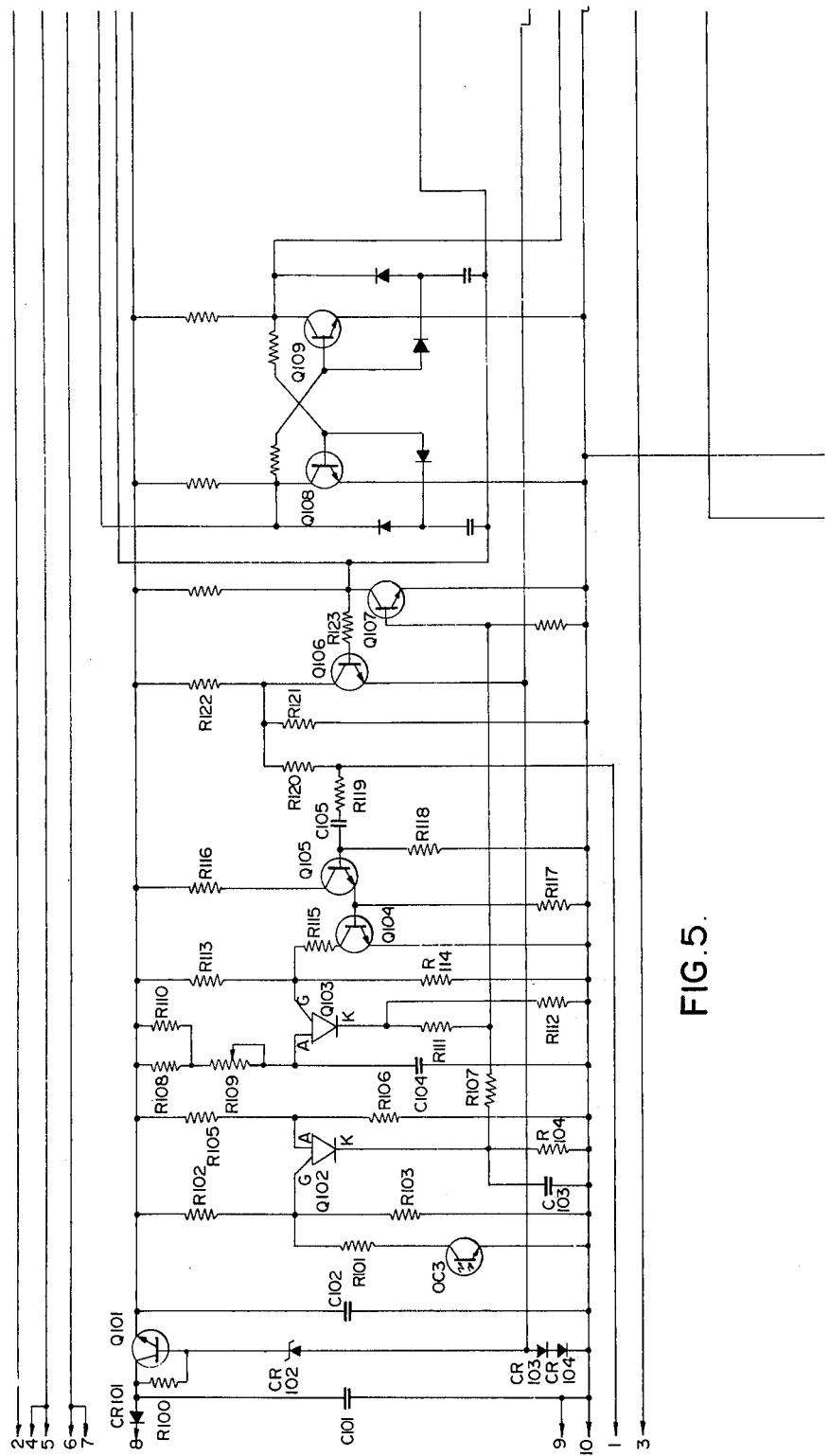
Figure 6:
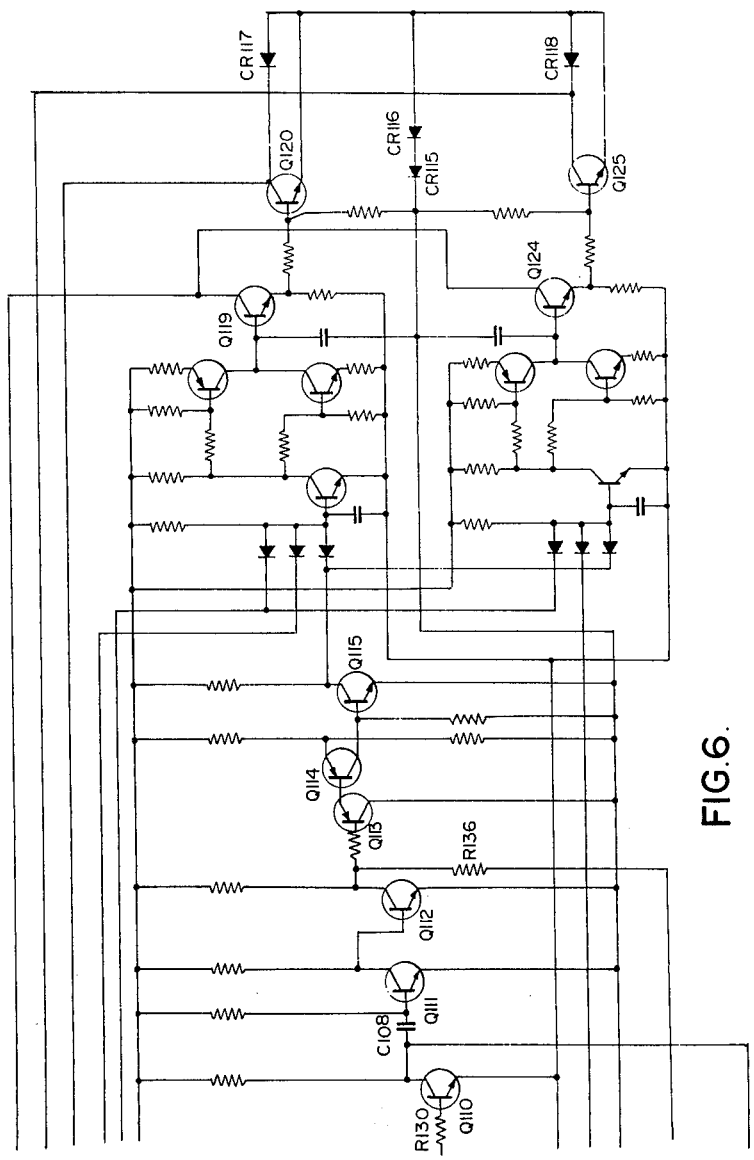

FIG. 4 is a general overall figure of another converter according to the invention including the power circuitry, and so forth, but not details of the control circuitry which are shown in FIGS. 5, 6, and 7. In general this embodiment is quite similar to that shown in FIG. 1. The battery input is fed via terminals 12 and 13 through the input filter made up of inductors L1 and L2 and capacitors C3 and C4. The control circuit J2 drives the driver transformer T1 which in turn drives the power transistors Q1 to Q4. These transistors in turn drive the power transformer T2, whose output is rectified by the bridge rectifier BR1. The output from the bridge rectifier is filtered through inductors L3 and L4, and capacitors C6 and C7. The output from this is passed on through the output polarity strapping board TB2 which determines whether or not the output is a positive plant or negative plant. i.e. negative or positive ground, respectively. Starting from left to right on the figure; I1 is an alarm light operated through R15 which is there to eliminate any possibility of having a dead short across the battery and to legthen the lifetime of the lamp because it is not working at full voltage. The lamp I1 is operated through the series contacts of the alarm relay K1 and diode CR1. Diodes CR1 and CR2 operate the ground circuit of the control board J2. It is necessary that the control ground be brought out externally onto terminal 1 of terminal board TB3, the "sync.common" so that all the control boards in a system (of paralleled converters) are commoned. But if only one converter is being used, the ground is applied to the control board through diode CR2 to pins 9 and 10 on the control board. CR1 is required so that the alarm lamp will be operated during an alarm condition. An alarm condition is a failure of the output of the converter or an over voltage or an under voltage or a current limit situation and this will be explained later. Lamps I2 and I3 are only intended as safety devices, i.e.

as ballast devices and not as indicating devices. Terminal 1 of the terminal block TB3 can be seen to be "hot" if it is considered that the negative of the battery plant is actually the "hot" side, positive being ground. Consequently if a short to ground is put on terminal 1, protection is provided by the lamps I2 and I3. But under normal conditions these lamps are cold, consequently their resistance is very low. When a short is put on they light and their resistance becomes very high and the current flow is restricted to a safe level.

Referring next to terminals 2 and 3 of terminal block TB3, it can be seen that these are coupled through relay contacts of K1 to terminals 1 and 3 of the control board J2, and these are the "sync.frequency" and "sync.width" controls which allows one of these converters to operate in parallel with one or more other converters of the same type. This paralleling operation will be explained in detail later.

Terminals 4, 5, 6, 7, 8 and 9 of terminal block TB3 provide termination for alarm contacts which are extended for alarming purposes in, for example, a telephone office, a place where such converters are particularly useful.

Terminal 10 is a chassis ground used for alarm purposes also.

Terminals 4 to 10 and associated relay contacts are not essential to the present invention and can be omitted if desired without influencing the converter operation.

CB1 is an input circuit breaker and the converter is started and released by the operation of this circuit breaker. Capacitors C1 and C2 on the input, as well as capacitors C8 and C9 on the output, provide suppression of radio frequency interference on the conducted lines. It was considered necessary to add these just to suppress some radio frequencies so that the converter would meet certain specifications set up by Canadian Standards Association. As stated before, capacitors C3 and C4, along with L1 and L2 make up the input filter for the converter which prevents unwanted transients from being fed back to the battery plant in the telephone office.

Resistor R6 provides a discharge path for the capacitors C3 and C4 in the filter during times when no other discharge path is provided. On the control board J2, resistors R7 and R8 are dropping resistors that are required because the control voltages on the control board are around 20 volts; consequently, dropping resistors are used.

The alarm relay K1 is illustrated just below the control board and diode CR9 across the relay suppresses voltage spikes that are caused when the relay is turned off. Auxiliary contacts CB' on the circuit breaker CB1 assure that relay K1 will release when the input power is disconnected from the converter through opening of circuit breaker CB1.

Through terminals 4, 5, 6 and 7, of control circuit J2, the driver transformer T1 is alternately driven to provide power for the switching transistors Q1 to Q4. The driver transformer T1 is driven so that current alternately goes from the center tap of the primary to the transformer T1 to terminals 4 and 5 or from the center tap to terminals 6 and 7 and out through the control board to, in this case, a negative side. The secondary, in turn, can be seen to drive the bases of either transistors Q1 and Q2 or Q3 and Q4. This is done in the case of Q1 and Q2, through a diode CR7 and resistors R1 and R2. R5 seen across the secondary is there to minimize overshoot that is inherent in any transformer of this type with a square wave. There has to be some resistance to absorb the energy whenever the transformer is turned "off".

Diodes CR7 and CR8 provide protection for the base-emitter junctions of the transistors by preventing a negative bias on them which could cause them to be destroyed. Resistors R1 and R2 as well as resistors R3 and R4 provide the means by which, for instance, transistors Q1 and Q2 will share their loads.

R19 and R20 are protection resistors for jacks J3 and J4. Through jacks J3 and J4 measurements can be made. However, if an accidental short is placed on these tip jacks no harm will be caused. Diodes CR3 and CR4 are backlash diodes preventing any reverse voltages from being put on the transistors as well as providing input polarity protection so that if someone inadvertently puts a reverse battery on the input the transistors will not be destroyed. These diodes will then forward bias and consequently trip the input circuit breaker CB1. As can be seen, either Q1 and Q2 are on or Q3 and Q4 are on, alternately driving the two halves of the primary winding of the power transformer T2. The control board J2 controls the time that these transistors are on and consequently the output from the power transformer T2, which is rectified by BR1, will have a varying pulse width. As the pulse gets wider, naturally the voltage will go up or more power can be provided to the load. Resistor R9 and capacitor C5 provide and RC circuit which supresses inductive switching spikes that could cause the rectifier bridge BR1 to be destroyed. L3 provides input filtering.

The current limit monitoring circuit that exists in this device will now be explained. The control circuit monitors the voltage across R10 and R11 and the closed contacts of switch S1 in normal operation. However, the switch S1 is provided for calibration or testing of the circuit. Resistor R16, below switch S1, acts to provide output power or power to the control board (terminal Z) for the output circuitry.

Referring again to the current monitor leads which are across R10 and the junction of CR5 and R16 and are connected to terminals 21 and 22 on the control board, it will be seen that if the switch contacts S1 are opened the voltage being monitored at that time will be the voltage drop across R10 and R11 as well as a forward voltage drop across the diode CR5. It is approximately ½ volt or 500 millivolts, at the point at which the circuit will start to current limit. Thus if the contacts S1 are opened there will automatically be at least ½ volt or more due to the forward voltage drop characteristics of the diode CR5. Consequently, if this switch S1 is depressed (to open its contacts) the current limit can be checked. That is it can be determined if the current limit circuitry is working. The current limit circuitry of this converter may not be brought into operation for many, many years if the converter is not overloaded. Consequently, it is desirable to have some method of checking that the current limit circuitry is in good working order.

The strapping board TB2 just determines which is the "hot" side, negative or positive.

For negative output (positive ground) the output strapping for TB2 is as follows:

8 – 15
9 – 16
10 – 17
11 – 18
12 – 19
13 – 20
14 – 21

For positive output (negative ground) the output strapping for TB2 is as follows:

1 – 8
2 – 9
3 – 10
4 – 11
5 – 12
6 – 13
7 – 14

CR6 is an output isolating diode. Consequently, if two or more converters are in parallel, and one of those converters has an internal short, that internal short will not cause any problems to the other parallel units. Output protection is provided by the fuse F1, and R14 is a current jump that is used in case an ammeter such as ammeter M2 is not used. A current strapping board is complicated by the fact that one should always make sure that the ammeter is on the "cold" side, thereby eliminating any problems if the ammeter is inadvertently grounded.

Reference will now be made to FIGS. 5, 6, and 7 which go together as shown in FIG. 8 to form a complete schematic of the control board J2 of FIG. 4.

Basically the control board consists of a unijunction oscillator which drives a bistable multivibrator or a flip-flop which in turn controls a three-input AND gate and a one-shot multivibrator. Thus one-shot multivibrator is controlled by an analogue circuit which in turn is controlled by the output voltage comparator circuit. Now the combination of these and the AND gate drive an output circuit which alternately drives the driver transistors which are connected to the drive transformer. Associated with this circuitry is of course the current limit circuitry made up of a blocking oscillator and the comparator circuit and an alarm circuit.

Referring to the upper left-hand side of FIG. 5, diode CR101 provides input protection in case there is an input polarity reversal. Capacitor C101 provides filtering and added capacity for the input. The voltage regulator circuit for the input control circuitry is provided by transistor Q101, resistor R100 and Zener diode CR102 and diodes CR103 and CR104. This circuitry is fairly self-explanatory; it is an emitter-follower type of circuitry whereby the base of Q101 is driven through resistor R100. Of course this base cannot rise above the voltage determined by Zener diode CR102 and diodes CR103 and CR104. Diodes CR103 and CR104 are included to provide additional bias; in certain circuits there are in effect two grounds and this ensures that certain transistors turn on and turn off. Capacitor C102 provides additional capacity for filtering out noise and transients.

Next in the circuit is the phototransistor part of OC3 which is part of the overvoltage cut-off circuit.

It is proposed now to explain Q103 and its associated circuitry and ignore for the time being Q102 which actually falls within another part of the circuit. Q103 comprises a unijunction oscillator and consists of a programmable unijunction transistor. An RC circuit made up of R108, R110, R109 (which is an adjustable potentiometer) and a capacitor C104 determines the frequency at which the unijunction oscillator will operate. A programmable unijunction transistor is a four-level device, something like an SCR. However, it is necessary that the anode A be more positive in potential than the gate G before it will fire. When it fires it will fire from the anode A to the cathode K and when it reaches a certain valley point it will turn off and charging of capacitor C104 will begin again. The voltage divider action of R113 and R114 determines the point at which the anode will break over, i.e. the firing point of the programmable unijunction transistor. R112 is a stabilizing resistor for the cathode of Q103. R111 is a limiting resistor for the signal taken from the cathode during normal oscillation. Synchronization of the frequencies between paralleled units will be explained later on. Transistors Q104, Q105, Q106 and resistors R115, R116, R117, R118, R119, R120, R121, R122 and capacitor C105 are all part of the synchronization circuit which will be explained a little later on. However, getting into the general description, when programmable unijunction transistor Q103 fires, it will forward bias or turn on transistor Q107 in a similar manner to the first embodiment. This in turn will operate the multivibrator or the flip-flop which is made up of the various components that are already known i.e. transistors Q108, Q109 and associated passive circuit elements. The one-shot multivibrator, which is exactly the same as used in the first embodiment is made up of Q110, C108, Q111 and associated resistors. Transistors Q112, Q113, Q114 and Q115 and their associated circuitry are required for synchronization of pulse width when more than one converter is used in a system and these and the synchronization will be explained a little later.

The circuitry from Q110 to Q115 is essentially the same as in the first embodiment. The gating circuitry is exactly the same and consequently all the drive circuitry is the same as the first embodiment with the following exceptions:

Transistors Q119 and Q124 are now driven externally, i.e. now get their source of energy externally through resistor R7 (FIG. 4). In the first embodiment the corresponding transistors Q15 and Q18 (FIG. 3) got their collector voltage from the general control voltage provided on the control board. Diodes CR115, CR116 provide a forward voltage drop which ensures that transistors Q120 and Q125 turn off completely. Diodes CR117 and 118 are reversed polarity diodes across the transistors Q120 and Q125 ensuring that they are protected against any reverse voltage spikes. The current limit circuit is essentially the same as before. It has previously been explained where the voltage is obtained between S1 and the junction of L3 and R10; this voltage is placed across terminals 21 and 22 (FIGS. 4 and 7) and the blocking oscillator will start to oscillate in a similar manner to that explained previously. In this case there are some differences; some more control functions are provided by the current limit circuitry. However, a DC level is provided by rectifier action of CR119 and filter capacitor C115. The DC level is determined by the setting of potentiometer R165 and in a similar manner, transistor Q127 will be gradually turned on as the output current approaches its predetermined point. Transistor Q128 is also turned on when Q127 is turned on. Transistor Q128 provides an alarm function by causing the alarm relay K1 to release whenever there is over current situation. This will be explained at the time that the alarm circuitry is explained but it must be remembered that pnp transistor Q128 will turn on when Q127 is turned on, some of the collector current of Q127 being provided through the base emitter junction of transistor Q128. The diode CR140 on the collector of Q128 provides protection so that no voltage is back-fed through the circuitry into the comparator circuitry. The resistor R167 is just a limiting resistor. The Zener diode CR120 provides the control voltage at which the output circuitry of the analogue control circuitry here will operate. The control circuitry here differs somewhat from the control circuitry outlined in the first embodiment due to the fact that the actual position of the light isolating coupler OC1 has been changed. The output is monitored and the result of this which is sampled at the wiper or control portion of the voltage setting potentiometer R13 (FIG. 4) comes in on terminal No. 11. Consider for example, the case where the output voltage increases for example due to a load being removed. When this occurs, the base current into transistor Q129 will be reduced and it will tend to turn down or conduct less. When this transistor conducts less, the base current of transistor Q131 will decrease and Q131 will conduct less. When transistor Q131 conducts less, less current flows through the photodiode of the light isolating coupler OC1 reducing its light output. This in turn affects the amount that the photo-transistor on the isolated side of this coupler OC1 is turned on and in turn, in a similar manner as before, will affect the charging of the timing capacitor C108 in the one-shot multivibrator thereby affecting the pulse width of the output. Most of the circuitry associated in the area of Q129 to Q131 is related to stability control and is somewhat complicated and not really germane to the invention. However, a brief explanation will be given here as to functions of certain components.

CR121 provides protection to the control circuitry in case an over-voltage occurs. It will be noted that it cannot go any more positive than the control voltage itself. Resistor R171 forms part of the overshoot circuitry that is associated with transistor Q130. Capacitor C116, resistor R173 and resistor R174 provide an RC timing circuit which prevents abnormal overshoots when the converter is turned on. Resistor R176, resistor R175, capacitors C117, C118, diodes CR127, CR128, resistor R177, diode CR129 are all part of the stability circuit that more or less damp the feedback and the gain of this circuit and prevent it from oscillating during times of step changes in voltage. Resistor R178 and potentiometer R179 provides limiting resistors for the light emitting diode in the light isolating coupler OC1. This is also tied in with the stability circuit; resistor R179 has to be adjusted in order to provide proper feedback. The comparator circuit, or the reference, is made up of Zener diode CR126, and forward silicon diodes CR123, 124 and 125. The caapacitor CC provides some squelching of overshoot transients that might cause the circuit to go into oscillation.

The converter is preferably provided with alarm circuitry although of course it is not essential. However, in the embodiment illustrated, some of the other components are tied in with the alarm circuitry so some explanation is required. The alarm circuitry provides an alarm if a converter fails or if there is (a) an over-voltage situation that is predetermined, (b) an under-voltage condition which can be predetermined or (c) a current limit situation that can be predetermined. These are all determined by potentiometer settings on the control board. The output voltage for the alarm circuitry is monitored over terminals 13 and 16 and as can be seen, they are placed across two resistor combinations one of which is R184 and R188 and the other of which is R186 and 187.

First of all, consider the low voltage alarm which is monitored by R184 and R188. R188 is a potentiometer which can be adjusted to give whatever predetermined lower voltage alarm may be required. When the output voltage drops before a certain predetermined level, it can be seen that base current will start to flow in transistor Q135. The point at which base current begins to be conducted is determined by the setting of potentiometer R188 and the voltage that is present across Zener diode CR136 which is in series with resistors R191 and R192. Thus there is a current flow down through R191 and R192 through the base-emitter junction of Q135 and down through the potentiometer R188. When this transistor Q135 is forward biased, it in turn will forward bias transistor Q138. The forward biasing of Q138 which turns it on will turn off transistor Q140 and when transistor Q140 turns off, it in turn will release the alarm relay K1. This then is the explanation of how the lower voltage alarm works; whenever the correct voltage is reached, there is no base current in Q135. Consequently, the result is that Q140 will turn on operating the alarm relay. It is to be understood that an alarm is established when the alarm relay K1 is released. The point at which the over-voltaage alarm circuit is actuated is determined by the setting of potentiometer R187. When the voltage on the wiper of R187 exceeds a predetermined amount, thus forward biasing transistor Q133, transistor Q133 will turn on and in turn through R189 will forward bias transistor Q136 which in turn will forward bias the pnp transistor Q137 which in turn through resistor R196 will forward bias Q138, thereby turning off Q140 and releasing the alarm relay K1 to establish an alarm. This same overvoltage alarm also provides over-voltage cut-off at a higher voltage than the over-voltage alarm and this is achieved by the firing of the programmable unijunction transistor Q141. There is a voltage at the anode A of Q141 determined by the output voltage or the voltage present at the emitter of Q133 and a voltage at the gate G of Q141 taken from the juncture of resistors R191 and R192. When the voltage difference between A and G reaches approximately ½ volt, the programmable unijunction transistor Q141 will fire. When it fires, it will conduct current through resistor R190 and the light emitting diode of OC3. What happens now is that the alarm is clamped on; the programmable unijunction transistor is a latching device. Consequently when the voltage starts to drop, the alarm remains clamped on due to the fact that a current flow has been established into the base of transistor Q138 thereby resulting in Q140 being turned off and relay K1 being released. Consequently an alarm condition is established.

At the same time, whenever the current is established through the light emitting diode of OC3, the phototransistor part of OC3 (FIG. 5) is affected. The result of the action of this circuitry is to turn the converter off. It is completely turned off and no more oscillation occurs. This is achieved in the following manner:

When the current is established through the light-emitting diode of OC3, it causes the phototransistor part of OC3 to be forward biased and it conducts. When it conducts, it puts resistor R101 across the resistor R103 which in turn lowers the voltage at the gate of the programmable unijunction transistor Q102. This drops that gate voltage below the anode voltage of the programmable unifunction transistor Q102 and causes it to fire. R105 is selected to provide holding current so that once the programmable unijunction transistor Q102 turns on it will not turn off. The holding current is sufficient to hold Q102 on until the whole converter has been turned off. However, when Q102 has fired, its current causes a voltage drop across resistor R104 which is applied to the base of transistor Q107 thus turning it on. This disables the rest of the circuitry causing it to turn right down. The only way this programmable unijunction transistor Q102 can be turned off is for the circuit breaker CB1 of the converter (FIG. 4) to be turned off; and it must remain off for approximately one minute.

A further function of the alarm circuitry concerns an over current situation. When an over-current situation occurs, as previously explained, Q128 turns on. When Q128 turns on, it can be seen that it in turn will forward bias transistor Q138 thereby establishing an alarm. Resistor R201, diodes CR134 and CR135, resistor R183, diodes CR133, CR132 and CR131 are all part of the output monitoring circuit. The resistors are tied in with the voltage adjust resistor R13 (FIG. 4) and they simply provide a limited range over which the voltage can be adjusted. The diodes provide forward voltage drops and isolation in such a manner that if the output fuse of the converter is removed or ruptures, the control circuitry will not sense a very low voltage which would result in a very wide pulse width and a very high voltage at the output filters. This provides that the output sensing circuit is still sensing some finite voltage.

Transistor Q139 and diode CR138 are provided so that when the output is strapped for a negative plant, that is positive ground, and the fuse is removed, transistor Q140 will be turned off thereby establishing an alarm.

The function of LED-1 will now be explained although it is not important to the invention. It is only necessary to know that it is necessary that an alarm be established if the output fuse F1 is removed or ruptures. In the case where checking is required, and the converter is used in a system of paralleled converters, it is necessary to remove the output fuse. If the output fuse is removed, an alarm is established immediately. It is therefore impossible for the alarm functions to be tested unless another indicating device is provided and this is provided by the light emitting diode LED-1 which operates and turns on in the same manner that the alarm lamp I1 operates except that it is mounted on the control board and it works independently of the output fuse. LED-1 is only an indicating device and has no other function.

Diode CR139 just ensures that Q140 will turn off.

Diode CR137 provides isolation between Q139 and LED-1.

These converters are intended to be used either singly or in a parallel mode. In a parallel mode, it is necessary to ensure that the converters equally share the load. According to the present invention this load sharing is achieved through synchronization of the control circuitry. To ensure that the converters are equally sharing the load, it is necessary that the output pulse widths be exactly the same. Consequently, it is necessary to synchronize the frequency at which two or more converters in the system are operating and also to synchronize the pulse width. Frequency synchronization will now be explained.

Referring to terminal No. 1 on the control board J2 (FIG. 4) this is tied by a sync.frequency line through contacts of relay K1 to terminal No. 2 of the terminal block TB3. In a system of paralleled converters all the terminals "2" (of TB3) are tied together. Consequently, when the converters are operating and the alarm relay is operated, one can see that all the No. 1 terminals on all control boards are tied together. Consider now the converter in the system that has the fastest frequency because the converter with the fastest frequency determines the frequency of all the other converters in the system. When the unijunction transistor Q103 fires, it puts a positive pulse through resistor R111 onto the base of transistor Q107. This in turn turns on Q107 which through resistor R123 will turn off Q106. When Q106 turns off, it results in a positive pulse being sent out over the sync.frequency line to terminal 1 of control board J2. This is provided through resistor R122 and R120. Resistor R121 is just a hold-down resistor for noise and so forth. Consequently, the fastest converter will send out a series of positive pulses over its sync.frequency line. Now consider what happens to the slower converters.

The slower converters will each receive positive pulses coming in on this same line, i.e. their sync.frequency line. These positive pulses will be fed through resistor R119 and capacitor C105 to the base of a normally non-conducting amplifier comprising transistors Q105 and Q104. A positive pulse will turn on that transistor Q105 and will in turn turn on transistor Q104. When transistor Q104 is turned on, it will place resistor R115 in parallel with resistor R114. When this is done, the gate voltage on programmable unijunction transistor Q103 will be lowered and consequently at that point, the unijunction transistor Q103 will fire an thereby operate the rest of its circuitry. So as can be seen, the programmable unijunction transistor of the fastest converter will in turn cause all the other programmable unijunction transistors Q103 in a system of paralleled converters to fire at the same time.

Much of this circuitry is required so that the loading of the various converters will not stop the circuit from operating. Up to eight converters can be paralleled at the same time.

C105 provides a capacitor input connection so that if a dead short is put on terminal No. 1 or the sync. frequency line, the system will not falter or stop.

The pulse width synchronization circuit will now be explained. It is important to note that the unit with the lowest voltage or the narrowest pulse width determines the pulse width of all the other converters. The one-shot multivibrator comprising Q110, C108 and Q111 feeds one input of each of the diode AND gates via amplifying means including at least one normally conducting transistor, in this case actually four transistors Q112 to Q115, which is turned off by the pulse output of the multivibrator. Transistor Q112 (FIG. 6) determines the point at which the output transistors Q120, Q125 will turn on or in other words the pulse width. This transistor Q112 is turned on i.e. is conducting until such time as the one-shot multivibrator is forward biased and turns it off. Transistor Q112 then in turn will control all the other converters. With reference to this one can see the feed-out through resistor R136 to the sync.width line and this in turn is tied through the relay contacts of the K1 alarm relay to terminal 3 on the TB3 terminal block. Consequently, if one or more of the transistors Q112 are "on" in the control circuitry, all other sync. width lines will be held to ground and consequently no gates will be enabled in any of the other control boards. Transistors Q113 and Q114 are required for loading purposes so that up to eight converters can be paralleled. However, it should be noted that transistor Q112 will hold off all the other converters. When the last Q112 has turned off, then all the gates are enabled in all the control circuits and consequently all the pulse widths will be the same.

All the synchronization lines are connected through the alarm relay and this is only required so that any defective converter has its control circuitry removed from the system once an alarm has been established. A further note — resistors R137 and R138 determine the point at which transistors Q113 and Q114 turn off.

What I claim as my invention is:

1. A DC to DC converter comprising a control circuit energizable by a source of DC current and having a first pair of output terminals connected in series with said source of DC current and one half of a center-tapped primary winding of a first transformer and a second pair of output terminals connected in series with said source of DC current and the other half of said center-tapped primary winding, said control circuit producing pulses alternately in the two halves of the center-tapped primary winding, said first transformer having a center-tapped secondary winding with each half of said secondary winding being connected to electronic switching means for causing pulses of current to flow said source of DC current alternately in two halves of a center-tapped primary winding of a second transformer, said second transformer having a secondary winding connected to a full wave rectifier having an output connected to an output filter for providing a smooth DC output from the converter, each of said pairs of output terminals being fed by an output transistor fed, in turn, by a driver transistor having an input fed by substantially square wave pulses and across which is connected a capacitor so that the pulses appearing at the output terminals of the control circuit are trapezoidal shaped and thus have substantially no harmonics of radio frequency.

2. A DC to DC converter as claimed in claim 1 and further comprising an input filter connected between said source of DC current and said current circuit.

3. A DC to DC converter as claimed in claim 1 wherein said electronic switching means comprise transistors.

4. A DC to DC converter as claimed in claim 1 wherein said control circuit comprises a unijunction oscillator driving a flip-flop and a one-shot multivibrator and feeding a first input of each of two three-input AND gates, said flip-flop having one output feeding a second input of one of said AND gates and a second output feeding a second input of the other of said AND gates and said one-shot multivibrator having a pulse output feeding a third input of each of said AND gates, each AND gate being associated with a different one of the pairs of outputs of the control circuit and, when enabled, resulting in current flow from its associated pair of output terminals, said converter further comprising feedback means responsive to current flow in the output of the converter for regulating the pulse duration of the one-shot multivibrator and hence the duration of time that the AND gates are enabled.

5. A DC to DC converter as claimed in claim 4 wherein the feedback means comprises a resistor in series with the output of the converter and across which leads are connected for deriving a feedback voltage proportional to output current from the converter, said feedback voltage feeding a blocking oscillator which produces an output voltage which is fed to a rectifier and integrator to produce a control voltage proportional to the output current of the converter, said control voltage being fed to control means which, in turn, affects the duration of output pulses from the one-shot multivibrator.

6. A DC to DC converter as claimed in claim 1 wherein said control circuit comprises a unijunction oscillator driving a flip-flop and a one-shot multivibrator and a feeding a first input of each of two three-input AND gates, said flip-flop having one output feeding a second input of one of said AND gates and a second output feeding a second input of the other of said AND gates and said one-shot multivibrator having a pulse output feeding a third input of each of said AND gates, each AND gate being associated with a different one of the pairs of outputs of the control circuit and, when enabled, resulting in current flow from its associated pair of output terminals, said converter further comprising feedback means responsive to output voltage of the converter for regulating the pulse duration of the one-shot multivibrator and hence the duration of time that the AND gates are enabled.

7. A DC to DC converter as claimed in claim 6 wherein the output voltage is fed back to a light emitting diode which produces light proportional to said output voltage, said light being coupled to a light sensitive transistor which produces a current which affects control means which, in turn, affects the duration of output pulses from the one-shot multivibrator.

8. A DC to DC converter as claimed in claim 7 wherein said light emitting diode is in series with a variable resistor so that the amount of feedback current to the light emitting diode can be manually adjusted.

9. A DC to DC converter as claimed in claim 5 wherein the integrator comprises a resistor in series with a capacitor and a potentiometer having a movable tap is connected in parallel with the capacitor, the control voltage being derived from the movable tap of the potentiometer.

10. A DC to DC converter as claimed in claim 4 wherein said unijunction oscillator drives said flip-flop and one-shot multivibrator and feeds the first inputs of the AND gates via a pulse former.

11. A DC to DC converter as claimed in claim 7 wherein said unijunction oscillator drives said flip-flop and one-shot multivibrator and feeds the first inputs of the AND gates via a pulse former.

12. A DC to DC converter as claimed in claim 4 wherein each AND gate, when enabled, produces a pulse which feeds an amplifier, which amplifier feeds one of said driver transistors.

13. A DC to DC converter as claimed in claim 7, wherein each AND gate, when enabled, produces a pulse which feeds an amplifier, which amplifier feeds one of said driver transistors.

14. A DC to DC converter as claim 1 and including means for directly energizing said control circuit from said source of DC current during startup of the converter and means for indirectly energizing said control circuit during normal operation of the converter.

15. A DC to DC converter as claimed in claim 14 wherein said means for indirectly energizing said control circuit comprises a tertiary winding on said second transformer.

16. A DC to DC converter as claimed in claim 15 wherein said tertiary winding provides a lower voltage than said DC source.

17. A DC to DC converter as claimed in claim 1 and further comprising a threshold responsive circuit having a first and a second input and an output connected to supply electrical energy to the control circuit, said first input being connected to the DC source and said second input being connected to a tertiary winding on said second transformer, said threshold responsive circuit being responsive to a predetermined voltage level on said second input so that when said threshold level is exceeded electrical energy is supplied to the control circuit from said second input whereas when said threshold level is not exceeded electrical energy is supplied to the control circuit from said first input.

18. A DC to DC converter as claimed in claim 17 wherein said threshold responsive circuit comprises a first and a second transistor each having a collector, a base, and an emitter, said first input being connected to the collector of the first transistor and through a resistor to the base of the second transistor, said second input being connected to the collector of the second transistor, the emitters of the two transistors being connected together and to an electrical energization line of positive polarity for the control circuit, the base of the first transistor being connected through a Zener diode to a negative polarity energization line for the control circuit, and the base of the second transistor being connected through at least one diode to the base of the second transistor.

\* \* \* \* \*